March 10, 1942.    J. F. SHIELLS    2,276,105
WHEEL TOOL
Filed April 10, 1940
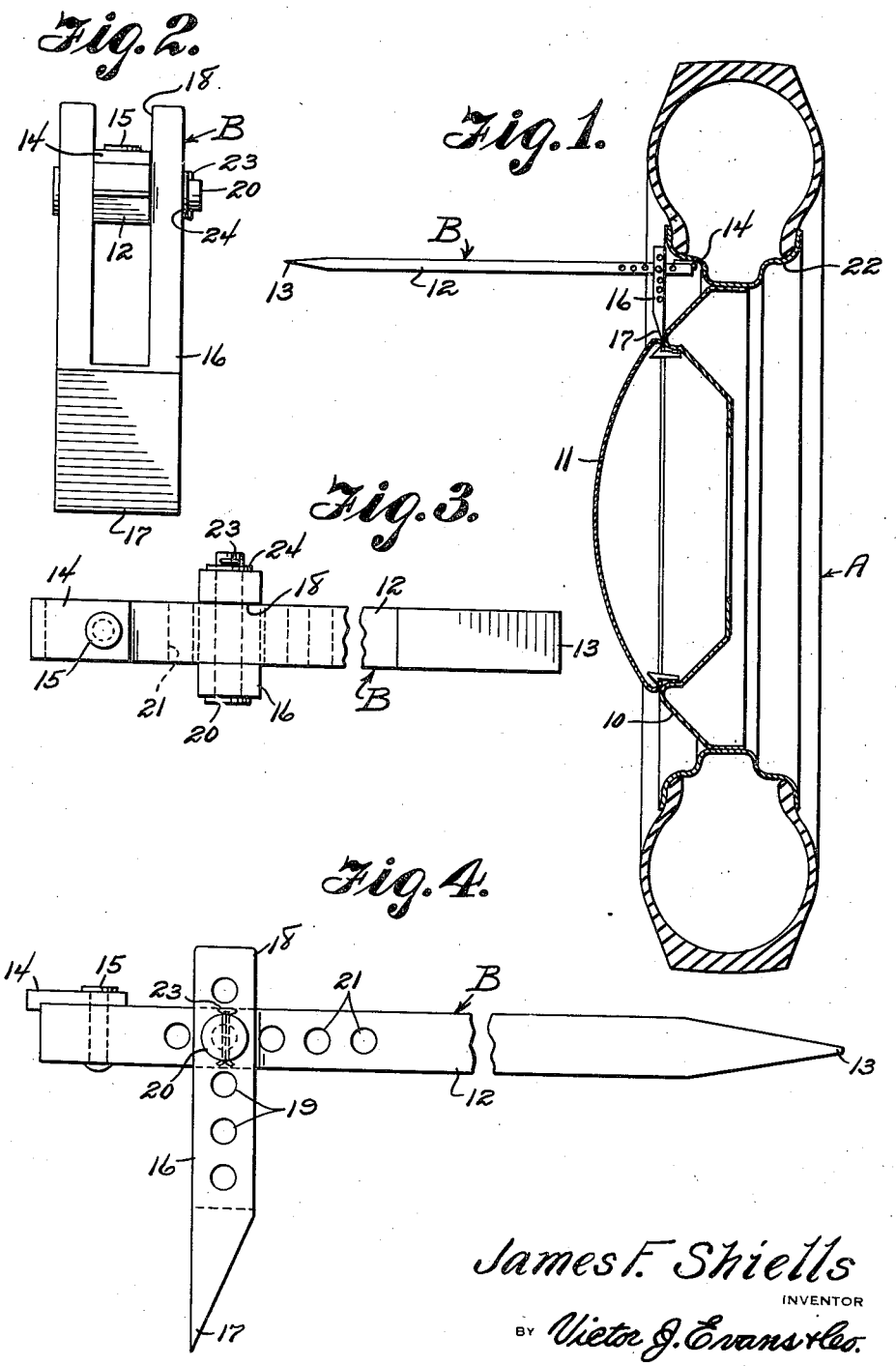
James F. Shiells
INVENTOR
BY Victor J. Evans & Co.
ATTORNEYS Patented Mar. 10, 1942

2,276,105

UNITED STATES PATENT OFFICE 2,276,105

WHEEL TOOL

James F. Shiells, Fillmore, Calif.

Application April 10, 1940, Serial No. 328,967

1 Claim. (Cl. 29—85)

The invention relates to a wheel tool and more especially to a prying tool for the removal of hub caps from automobile wheels.

The primary object of the invention is the provision of a tool of this character wherein through the use thereof a hub cap of present-day construction used on automobile wheels can be readily and conveniently unlatched for the removal thereof from the wheel, the tool being adjustable to adapt the same for different sizes of wheels and for the placement in working position relative to the wheel disk and the hub cap so that the latter can be conveniently and easily removed in that one hand of the operator is free to make contact with the cap on its removal so as to avoid the dropping thereof with resultant damage thereto.

A further object of the invention is the provision of a tool of this character wherein proper leverage can be had so that the hub cap upon a wheel can be quickly, easily and without damage removed from the wheel in that the finish of the wheel will not be disturbed or will the cap be damaged in the use of the tool.

A still further object of the invention is the provision of a tool of this character, which is extremely simple in its construction, portable, readily and easily adjusted, possessing few parts, easy of assembly and disassembly, strong, durable, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention and pointed out in the claim hereunto appended.

In the accompanying drawing:

Figure 1 is a vertical sectional view through a tired wheel wearing a hub cap and showing the tool constructed in accordance with the invention in applied position for the removal of said hub cap.

Figure 2 is an enlarged end elevation of the tool removed from applied position.

Figure 3 is a fragmentary top plan view.

Figure 4 is a side elevation of the tool, being on an enlarged scale.

Similar reference characters indicate corresponding parts throughout the several views in the drawing.

Referring to the drawing in detail, A designates generally a portion of an automobile tired wheel having the disk center 10 with which is latched a separable hub cap 11, the latching thereof being in the conventional manner, and to remove such cap from the wheel it must be pried therefrom, an ordinary screwdriver being generally employed for this purpose. The tool constituting the present invention is denoted at B and comprises an elongated bar 12, preferably straight throughout its extent, having at one end a screwdriver-like tip 13. This bar constitutes a fulcrum lever. The other blunt end of the bar at the upper side thereof carries a fibrous piece 14, preferably made from leather, and is a protective pad or facing, being fixed by a rivet 15 to said bar.

Adjustably associated with the bar 12 is a prying leg or member 16, being straight throughout the major length thereof and having a beveled prying tip 17 at one end while at the other end is a fork 18 loosely accommodating the bar 12. This fork 18 is formed throughout the major straight portion of the member 16. The sides of the fork 18 have transversely aligned openings 19 for a pivot member 20, which is engageable in selective openings, these being spaced apart at determined intervals with respect to each other.

The pivot member 20 is also accommodated in holes or openings 21 provided in the bar 12, these holes or openings being spaced at determined intervals with respect to each other. In this manner the bar 12 is susceptible of adjustment relative to the member 16 and similarly the member 16 is adjustable relative to the bar 12, the adjustments being at substantially right angles to each other. Such adjustments accommodate the tool to different sizes of wheels and hub caps equipped therewith.

In the use of the tool, the member 16 is disposed vertically to have the beveled ends 17 engage between the disk 10 of the wheel A and the hub cap 11 at the joint therebetween when the hub cap is worn by said wheel and the end of the bar 12 carrying the piece 14 is brought into fulcrum relation to the rim 22 of the said wheel A, that is, against the inner periphery of this rim, so that when the bar 12 is pressed downwardly through manual manipulation thereof, the member 16 at the end 17 thereof will pry the cap 11 from latched engagement with the wheel. Also a lateral swinging of the tool when engaged as before stated will serve to unlatch the hub cap 11 from the wheel A.

The pivot 20 is in the form of a headed bolt and for securing the latter for the pivotal connection of the members 12 and 16 the said bolt is fitted with a cotter pin 23, being also equipped with a washer 24 next to the said cotter pin, the head and washer being at the outer faces of the sides of the fork 18.

What is claimed is:

A tool of the character described, comprising a lever bar having a flat fulcrum surface at one end and horizontal transverse openings adjacent thereto, a prying member having a bifurcated upper end straddling the lever bar and provided with a series of horizontal oppositely arranged openings, a pivot pin passing loosely through two of the oppositely arranged openings in the prying member and one of the openings in the lever bar, and the lower end of the prying member provided with a beveled prying tip.

JAMES F. SHIELLS.